(12) United States Patent
Gandra et al.

(10) Patent No.: US 11,551,342 B2
(45) Date of Patent: Jan. 10, 2023

(54) FIXTURE FOR EVALUATING HEADS-UP WINDSHIELDS

(71) Applicant: Pittsburgh Glass Works, LLC, Pittsburgh, PA (US)

(72) Inventors: Andres Enrique Gudino Gandra, Greensboro, NC (US); Felipe Guzman Botero, Karlstruhe (DE); Anel Garza Rivera, Garcia (MX)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 464 days.

(21) Appl. No.: 16/838,622

(22) Filed: Apr. 2, 2020

(65) Prior Publication Data

US 2020/0320681 A1 Oct. 8, 2020

Related U.S. Application Data

(60) Provisional application No. 62/828,591, filed on Apr. 3, 2019.

(51) Int. Cl.
| | |
|---|---|
| *G06T 7/00* | (2017.01) |
| *G06T 7/70* | (2017.01) |
| *G02B 27/00* | (2006.01) |
| *B60J 1/02* | (2006.01) |
| *G02B 27/01* | (2006.01) |

(52) U.S. Cl.
CPC ............... *G06T 7/0004* (2013.01); *B60J 1/02* (2013.01); *G02B 27/0018* (2013.01); *G02B 27/0037* (2013.01); *G02B 27/01* (2013.01); *G06T 7/70* (2017.01); *G02B 2027/0196* (2013.01)

(58) Field of Classification Search
CPC . G06T 7/0004; G06T 7/70; B60J 1/02; G02B 27/0018; G02B 27/0037; G02B 27/01; G02B 2027/0196; G02B 27/0101
USPC ......................................................... 382/141
See application file for complete search history.

(56) References Cited

U.S. PATENT DOCUMENTS

| | | | |
|---|---|---|---|
| 2015/0168719 A1* | 6/2015 | Kim ...................... | G02B 27/01 345/7 |
| 2019/0064517 A1* | 2/2019 | Tang-Kong ........ | G01M 11/0257 |
| 2020/0386992 A1* | 12/2020 | Wei ........................ | H04N 17/00 |
| 2022/0058780 A1* | 2/2022 | Kobayashi ............. | G09G 3/002 |

* cited by examiner

*Primary Examiner* — Mohammed A Hasan
(74) *Attorney, Agent, or Firm* — Dentons Cohen & Grigsby P.C.

(57) ABSTRACT

A test fixture (10) for heads-up windshields (12) wherein aspherical devices (26) compensate for complex curvatures and optical aberrations in a heads-up display surface (16) of the windshield. A movable test grid (20) adjusts the elevation of preferred camera settings and a pivotal mounting of the test grid (20) enhances ghost image reduction and improves camera image resolution. A filter (36) limits interference of secondary ghost images (caused by IR coatings) with compliance assessment of the windshield.

18 Claims, 11 Drawing Sheets

Virtual image focusing
flat metal test grid test grid with tilt

FIG. 11
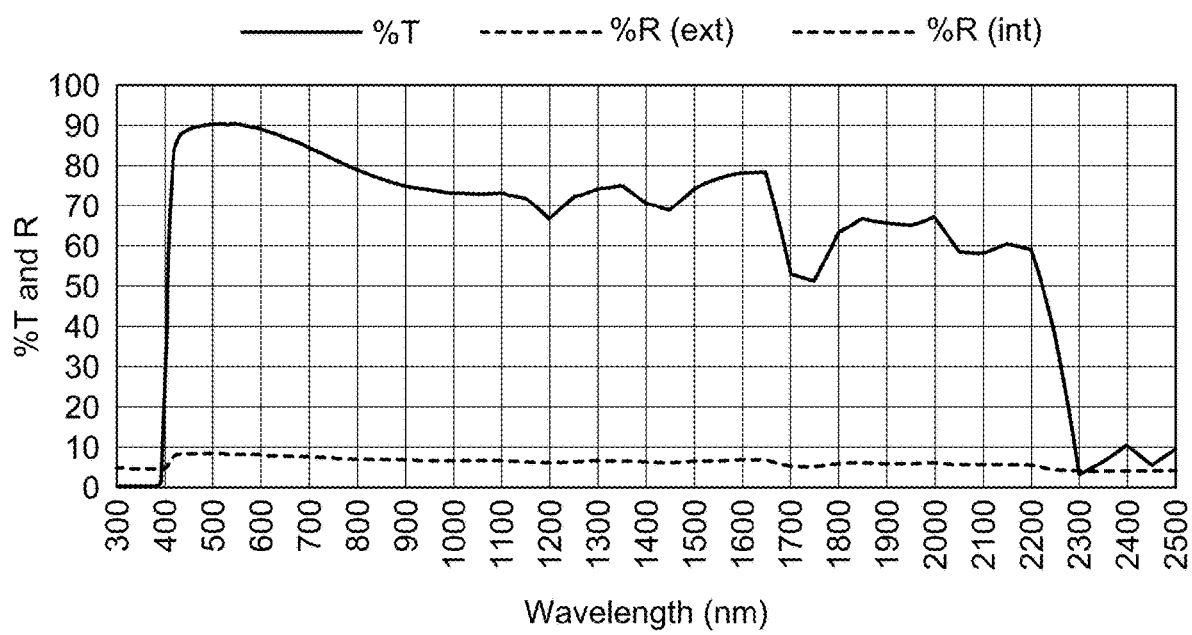
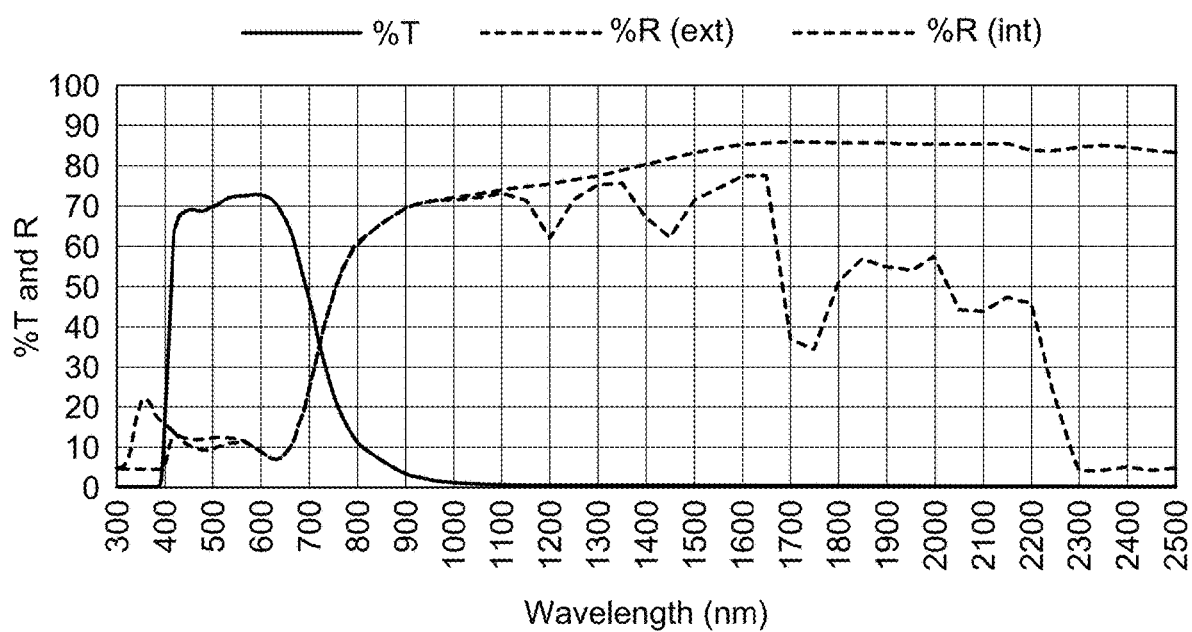

FIG. 11(Cont'd)

| Wavelength [nm] | Transmission | Reflection | Wavelength [nm] | Transmission | Reflection |
|---|---|---|---|---|---|
| 380 | 0.0001 | 0.0453 | 380 | 0.0001 | 0.0453 |
| 385 | 0.0015 | 0.0452 | 385 | 0.0008 | 0.0452 |
| 390 | 0.0143 | 0.0451 | 390 | 0.0082 | 0.0451 |
| 395 | 0.0794 | 0.0453 | 395 | 0.0498 | 0.0461 |
| 400 | 0.2446 | 0.0479 | 400 | 0.1632 | 0.0553 |
| 410 | 0.6675 | 0.0666 | 410 | 0.4841 | 0.1102 |
| 420 | 0.8405 | 0.0791 | 420 | 0.6374 | 0.1329 |
| 430 | 0.8743 | 0.0816 | 430 | 0.6764 | 0.1251 |
| 440 | 0.8826 | 0.0821 | 440 | 0.6864 | 0.1141 |
| 450 | 0.8881 | 0.0823 | 450 | 0.6895 | 0.1051 |
| 460 | 0.8947 | 0.0826 | 460 | 0.6906 | 0.0990 |
| 470 | 0.8965 | 0.0825 | 470 | 0.6891 | 0.0951 |
| 480 | 0.8982 | 0.0824 | 480 | 0.6895 | 0.0937 |
| 490 | 0.8997 | 0.0823 | 490 | 0.6928 | 0.0944 |
| 500 | 0.9015 | 0.0822 | 500 | 0.6994 | 0.0969 |
| 510 | 0.9025 | 0.0821 | 510 | 0.7066 | 0.1004 |
| 520 | 0.9032 | 0.0819 | 520 | 0.7132 | 0.1043 |
| 530 | 0.9023 | 0.0817 | 530 | 0.7182 | 0.1079 |
| 540 | 0.9029 | 0.0815 | 540 | 0.7231 | 0.1107 |
| 550 | 0.9008 | 0.0812 | 550 | 0.7248 | 0.1118 |
| 560 | 0.8997 | 0.0809 | 560 | 0.7268 | 0.1111 |
| 570 | 0.8972 | 0.0805 | 570 | 0.7275 | 0.1082 |
| 580 | 0.8947 | 0.0802 | 580 | 0.7277 | 0.1034 |
| 590 | 0.8931 | 0.0799 | 590 | 0.7286 | 0.0970 |
| 600 | 0.8900 | 0.0795 | 600 | 0.7275 | 0.0895 |
| 610 | 0.8862 | 0.0790 | 610 | 0.7238 | 0.0816 |
| 620 | 0.8823 | 0.0786 | 620 | 0.7173 | 0.0753 |
| 630 | 0.8784 | 0.0782 | 630 | 0.7067 | 0.0720 |
| 640 | 0.8728 | 0.0776 | 640 | 0.6894 | 0.0735 |
| 650 | 0.8694 | 0.0772 | 650 | 0.6676 | 0.0821 |
| 660 | 0.8649 | 0.0767 | 660 | 0.6373 | 0.0986 |
| 670 | 0.8599 | 0.0762 | 670 | 0.5996 | 0.1243 |
| 680 | 0.8551 | 0.0758 | 680 | 0.5559 | 0.1583 |
| 690 | 0.8496 | 0.0752 | 690 | 0.5074 | 0.1997 |
| 700 | 0.8438 | 0.0747 | 700 | 0.4562 | 0.2460 |
| 710 | 0.8385 | 0.0742 | 710 | 0.4055 | 0.2953 |
| 720 | 0.8329 | 0.0737 | 720 | 0.3563 | 0.3436 |
| 730 | 0.8273 | 0.0732 | 730 | 0.3109 | 0.3913 |
| 740 | 0.8220 | 0.0727 | 740 | 0.2696 | 0.4351 |
| 750 | 0.8158 | 0.0722 | 750 | 0.2326 | 0.4745 |
| 760 | 0.8101 | 0.0717 | 760 | 0.2003 | 0.5099 |
| 770 | 0.8050 | 0.0713 | 770 | 0.1726 | 0.5415 |
| 780 | 0.7995 | 0.0708 | 780 | 0.1487 | 0.5675 |

FIXTURE FOR EVALUATING HEADS-UP WINDSHIELDS

RELATED APPLICATIONS

This application claims priority to U.S. Provisional Patent Application No. 62/828,591 filed Apr. 3, 2019, the entirety of which is incorporated by reference herein.

BACKGROUND OF THE INVENTION

Field of the Invention

The presently disclosed invention relates to heads-up displays in the forward-facing windshields of land and aircraft vehicles and, more particularly, methods and systems for evaluating the compliance with such windshields with performance specifications.

Discussion of the Prior Art

Heads-up display systems have been used in prior land and aircraft vehicles to project an image in the field-of-view of the vehicle operator. Typically, the image displays information such as vehicle system conditions such as fluid pressures or temperatures, or conditions external to the vehicle environment such as ambient temperature or elevation. The location of this information within the operator's field-of-view allows the operator to monitor that information without distracting attention from the pathway that the vehicle is taking. This allows for more fully informed, safer operation of the vehicle.

In heads-up displays, an illumination beam of the display image is projected from a location inside the vehicle onto the inside surface of the windshield. Most of the illumination beam is reflected by the inside surface of the windshield in a direction toward the operator. The position and incident angles of the illumination beam are controlled such that the operator sees the reflected light and views it in such a way that it appears to the operator as originating from a focal point that is on the outer side of the windshield. That is, the operator interprets the projected image to be originating from a point that is outside (and in front of) the vehicle.

Vehicle safety considerations have also generally required that forward-facing windshields are of a laminate construction wherein two panes of annealed glass or other transparent material are laminated together with a sheet of transparent interlayer material such as polyvinyl butyral ("PVB") or similar material. The interlayer material is sandwiched between the two transparent panes. If the windshield should become heavily impacted, the broken glass would remain attached to the interlayer to avoid them from severely injure the vehicle operator or another passenger. When the transparent panes are broken, the lamination of glass panes to the interlayer limits dispersion of the glass pieces to further reduce exposure of the operator and passengers to sharp fragments of the transparencies.

It has been found that the use of such laminated windshields causes complications with the projection of heads-up displays. Most of the illumination beam is reflected from the inside surface of the windshield. However, a portion of the illumination beam is not reflected from the inside surface of the windshield. Rather, a portion of the illumination beam is refracted at the inside surface of the windshield and propagates through the inner transparent pane, the interlayer, and the outer transparent panel. Such boundaries in the windshield are generally referred to by reference number— "surface number 1" for the outside surface of the outermost transparent panel; "surface number 2" for the surface of the outermost panel that is opposite from surface number 1; "surface number 3" for the surface of the innermost transparent panel that faces the interlayer; and "surface number 4" for the surface of the innermost transparent panel that is opposite from surface number 3. Surface number 4 is also the inner surface of the windshield.

Each boundary between different materials represents a change in refractive index and a reflection from each boundary. Accordingly, surfaces 1, 2, 3, and 4 all reflect some portion of light back toward the operator. Light that is incident to surfaces 1, 2, 3, and 4 and reflected toward the operator may appear to the operator as respective, separate images that are laterally separated. The separation space is determined according to the angle of incidence, the separation between surfaces 1, 2, 3, and 4 according to the thicknesses of the inner transparent panel, the interlayer, and the outer transparent panel.

Because the change in refractive index is greatest at surface number 1 and surface number 4, the reflections from those surfaces are the most intense. The number 1 surface and the number 4 surface of the windshield are separated by the overall thickness of the windshield. The image from light that is reflected from the number 4 surface of the windshield will not have passed through any portion of the windshield whereas light that is reflected from the number 1 surface of the windshield will have twice passed through the thickness of the windshield. Accordingly, the light reflected from the number 1 surface of the windshield will be seen by the operator as having lower intensity than from the number 4 surface, thus, presenting a fainter image. Due to this fainter appearance, the image reflected from the number 1 windshield surface is often referred to as a "ghost" image.

It has been recognized that the source of the ghost image in heads-up displays is reflection from the number 1 surface of the windshield and the geometry of the illuminating light pathway relative to the separation between the number 1 surface and the number 4 surface of the windshield. Accordingly, a solution for obscuring ghost images in heads-up displays has been to modify the geometry of the separation between the number 1 surface and the number 4 surface of the windshield. Namely, the interlayer has been modified to be thinner near the lower edge of the windshield so that a vertical cross-section of the interlayer is wedge-shaped. This has been found to help superimpose the reflections from the number 1 surface and the number 4 surface as seen by the operator and conceal a distracting double image.

While the use of wedge-shaped interlayers and other developments have reduced double images and made other quality improvements to heads-up displays, other difficulties still have persisted. For example, issues of aerodynamics, function and fashion are dominant factors concerning the orientation, shape and geometry of vehicle windshields. The windshields have developed to have a relatively complex shape and the shape is different for virtually every make and model of automobile. The many variables in windshield orientations and shapes and the virtual nature of the heads-up display itself have caused difficulty in designing a windshield that meets manufactures' specifications for resolution and other performance of windshields used in heads-up systems.

Furthermore, cameras and other mechanical elements of test fixtures and test protocols have inherent limitations that cannot exactly duplicate human visual sense. Those limitations have made development of a mechanical fixture for testing heads-up windshields for compliance with heads-up performance specifications difficult and expensive.

Accordingly, there has been a need for a fixture that windshield manufacturers could use to quickly, reliably, and repeatedly test the performance of windshields for use in heads-up applications over a range of vehicle makes and models.

SUMMARY OF THE INVENTION

In accordance with the presently disclosed invention, a test fixture for windshields supports testing of windshields that are intended for use in vehicles with heads-up display systems. The purpose of the testing is to confirm that the windshields meet the vehicle manufacturer's windshield specifications for clarity of virtual images. The test system is a fully mechanical system that includes compensation for differences between mechanical imaging and human vision capabilities.

The presently disclosed invention includes a frame that holds components of the test fixture in place with respect to each other and with respect to the windshield that is the test object. The components include a test grid and light source, a camera, a device that defines an aspheric surface, and a computer that is configured to identify and measure elements of the test grid that appear in the virtual image of the heads-up display. The frame maintains the windshield that is under test. The windshield includes a transparent panel that defines a heads-up display surface. A beam from the light source defines an image of the test grid that illuminates the heads-up display surface of the windshield and that is reflected from the heads-up display surface to the camera.

The camera can attain only one focal point at a time. Typically, differences of tangential and sagittal radius of the windshield's curvature result in more than one focal point for images viewed through the windshield and often results in blurring of the image that the camera captures. Moreover, optical aberrations in the heads-up surface can result in other image complications such as astigmatism and coma, especially in applications where it is desired that the position of the virtual image is at a substantial distance from the windshield. Under such conditions, camera images tend to be unclear and camera-based automatic test fixtures have difficulty in reliably assessing the heads-up display performance of the windshield and compliance with manufacturer specifications.

To cure these and other problems, the test fixture includes a device with an aspheric surface. The aspheric device is in the path of the beam that travels from the light source to the heads-up display surface, and from the heads-up display surface to the camera. When the aspheric surface is illuminated by the beam from the light source, it modifies the light beam to compensate for the effects of differences in the windshield's curvature and for optical aberrations in the heads-up surface. The light beam thus modified tends to afford camera images with higher resolution and, thus, enhances the accuracy and reliability of the test fixture.

In several disclosed embodiments, the test fixture includes different types of aspheric devices. In one such embodiment, the aspheric device is an aspheric mirror that is illuminated by the beam of said light source. The aspheric mirror compensates for curvatures in the windshield and aberrations in the heads-up surface so that the reflected image from the heads-up surface can be more nearly focused by the camera.

In another embodiment, the aspheric device is an aspheric lens with a customized radius of curvature or may be a toroidal aspheric lens. The aspheric lens is illuminated by the image that is reflected from the heads-up surface toward the camera and refracts the light to compensate for curvatures in the windshield and aberration in the heads-up surface so that the camera can better focus the reflected image from the heads-up surface.

In some cases it is preferred that the test grid is moveable with respect to the heads-up surface of the transparent panel. In this embodiment, the position of the test grid can be moved away from the heads-up surface and the camera can be moved to a lower elevation to better evaluate the heads-up capability of the windshield. To better evaluate the heads-up capability of the windshield from a higher camera elevation, the position of the test grid can be moved toward the heads-up surface and the camera can be moved to a higher elevation.

In other cases, the test grid can be made pivotal about a first axis to adjust the separation between the test grid and the heads-up surface and increase the resolution of the image in the test grid and the virtual heads-up image.

Especially in cases wherein the windshield includes an IR coating, it may also be preferred to add a band-pass filter to the test fixture. The IR coating may reflect light to the camera that appears as a second ghost image. The filter is located between the heads-up surface and the camera and passes only light within a bandwidth of a portion of the visible light spectrum where reflectivity of light from the IR coating is lowest. In this way, the intensity of the second ghost image is low and the test fixture is less likely to incorrectly interpret the virtual image due to the presence of the secondary ghost image.

Other objects and advantages of the presently disclosed invention will become apparent to those skilled in the art as the following description of a presently preferred embodiment thereof proceeds.

BRIEF DESCRIPTION OF THE DRAWINGS

A presently preferred embodiment of the presently disclosed invention is described herein and illustrated in connection with the accompanying drawings wherein;

FIG. 11 is a line graph showing the transmissivity and reflectivity of glass laminates with and without IR coatings over a range of wavelengths.

PRESENTLY PREFERRED EMBODIMENTS OF THE INVENTION

Figure 1:
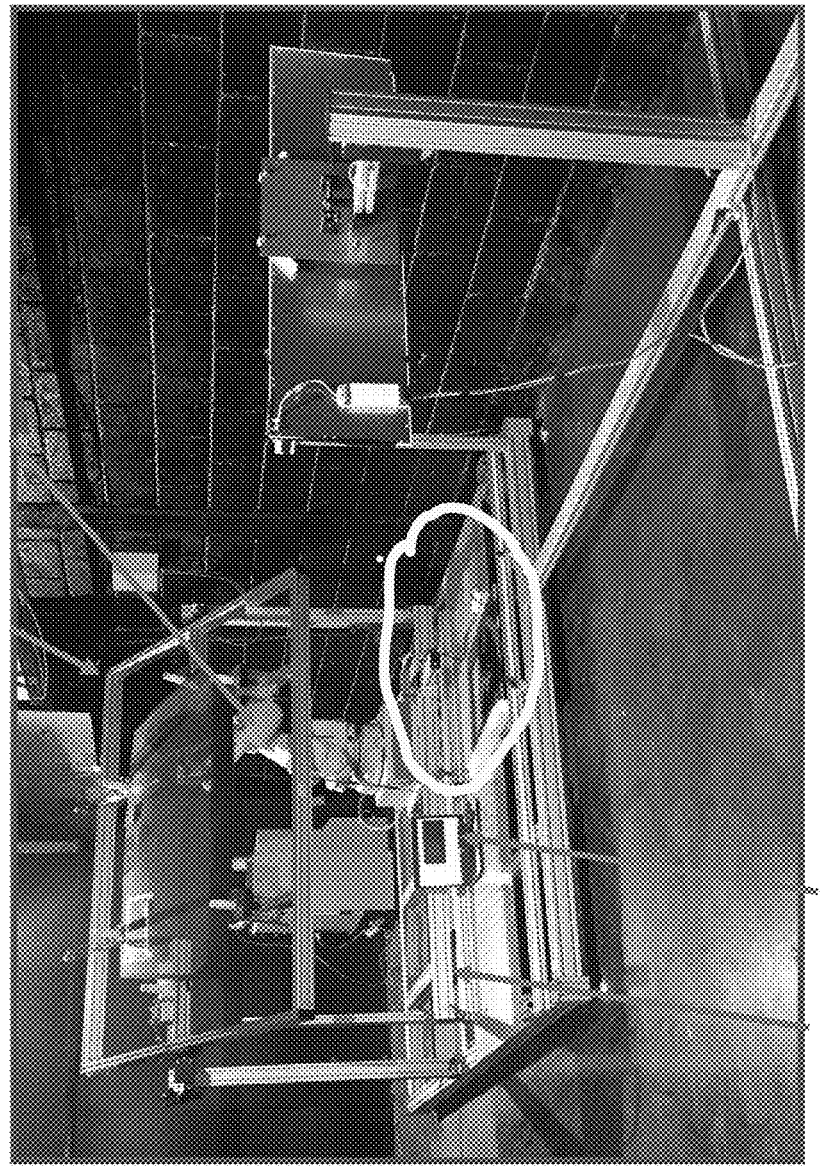
FIG. 1 shows an example of a test fixture in accordance with one embodiment of the presently disclosed invention.

An embodiment of the presently disclosed invention is shown in FIG. 1. In FIG. 1, a test fixture 10 supports testing of windshields that are intended for use in vehicles with heads-up display systems. More specifically, test fixture 10 tests the performance of the heads-up display feature of a windshield 12 that is intended for use in a selected make and model of a vehicle. The purpose of the testing is to confirm that the windshields meet the vehicle manufacturer's windshield specifications for clarity of virtual images in the heads-up system. Test system 10 is a mechanical system that includes compensation to close differences between mechanical imaging and human vision capabilities.

Test fixture 10 includes a frame 14 that maintains windshield 12 that is under test. Windshield 12 includes a transparent panel that defines a surface 16 used in the production of heads-up displays. Heads-up display surface 16 may include one or more optical aberrations. Optical aberrations are referred to herein as a property of an optical system that causes light to spread over an area as opposed to being focused at a point. Aberrations can result in distortion or blurring of an image. The nature of the distortion depends on the type of aberration. In an imaging system, an aberration can cause light from a point on an object not to converge into a single point after transmission through the imaging system. Other reasons for distortion and blurring of an image include differences of the tangential and sagittal radius of the windshield's curvature. Such condition also can result in more than one focal point for images viewed through the windshield.

The absence of a single focal point can compromise the accuracy and reliability of a text fixture for proving specification compliance with windshields for use in heads-up displays. As further explained below, test fixture 10 includes a camera 18. Camera 18 can attain only one focal point at a time. Typically, the differences of tangential and sagittal radius of the windshield's curvature result in more than one focal point for images viewed through the windshield and often result in blurring of the image that the camera captures. Moreover, optical aberrations in the heads-up surface can result in other image complications. Under such conditions, camera images tend to be unclear and camera-based automatic test fixtures have difficulty in reliably using such camera images to assess the heads-up display performance of the windshield and compliance with manufacturer's specifications.

A beam from a light source and test grid 20 defines an image of the test grid that illuminates the heads-up display surface 16 of windshield 12. The image of the test gird 20 is reflected from the heads-up display surface 16 to camera 18. Test grid and light source 20 is mounted on frame 14 and configured in accordance with a selected test pattern on the surface of test grid 20. Test grid 20, including the test pattern, correspond to a selected make and model of vehicle.

Figure 5:
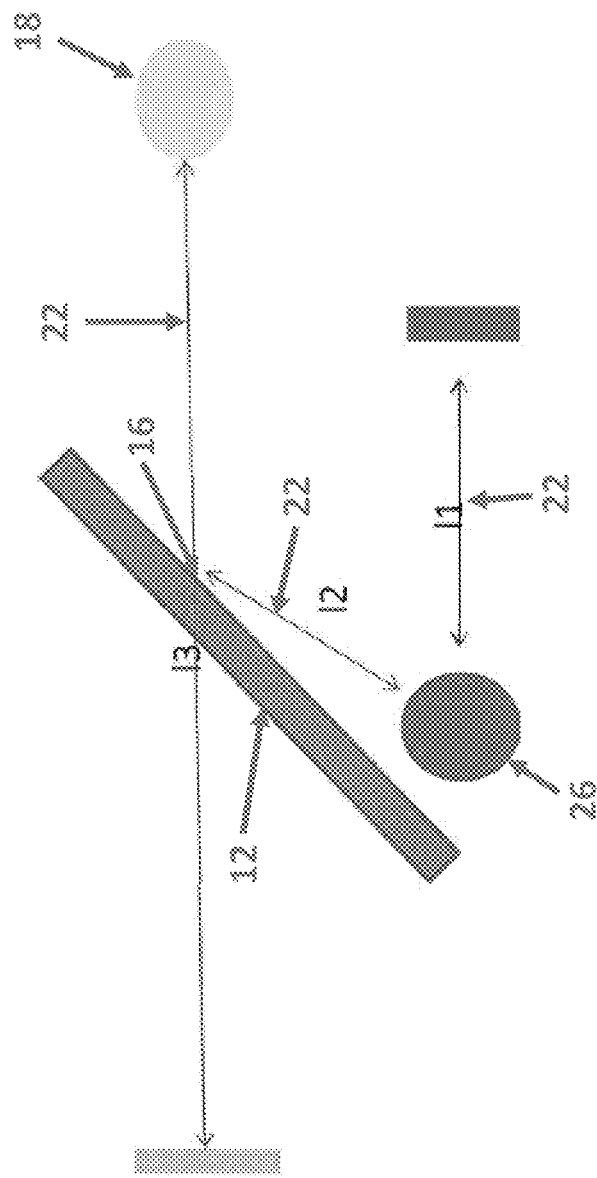
FIG. 5 is a diagram that illustrates an embodiment of the presently disclosed invention that includes an aspheric mirror.
Figure 6:
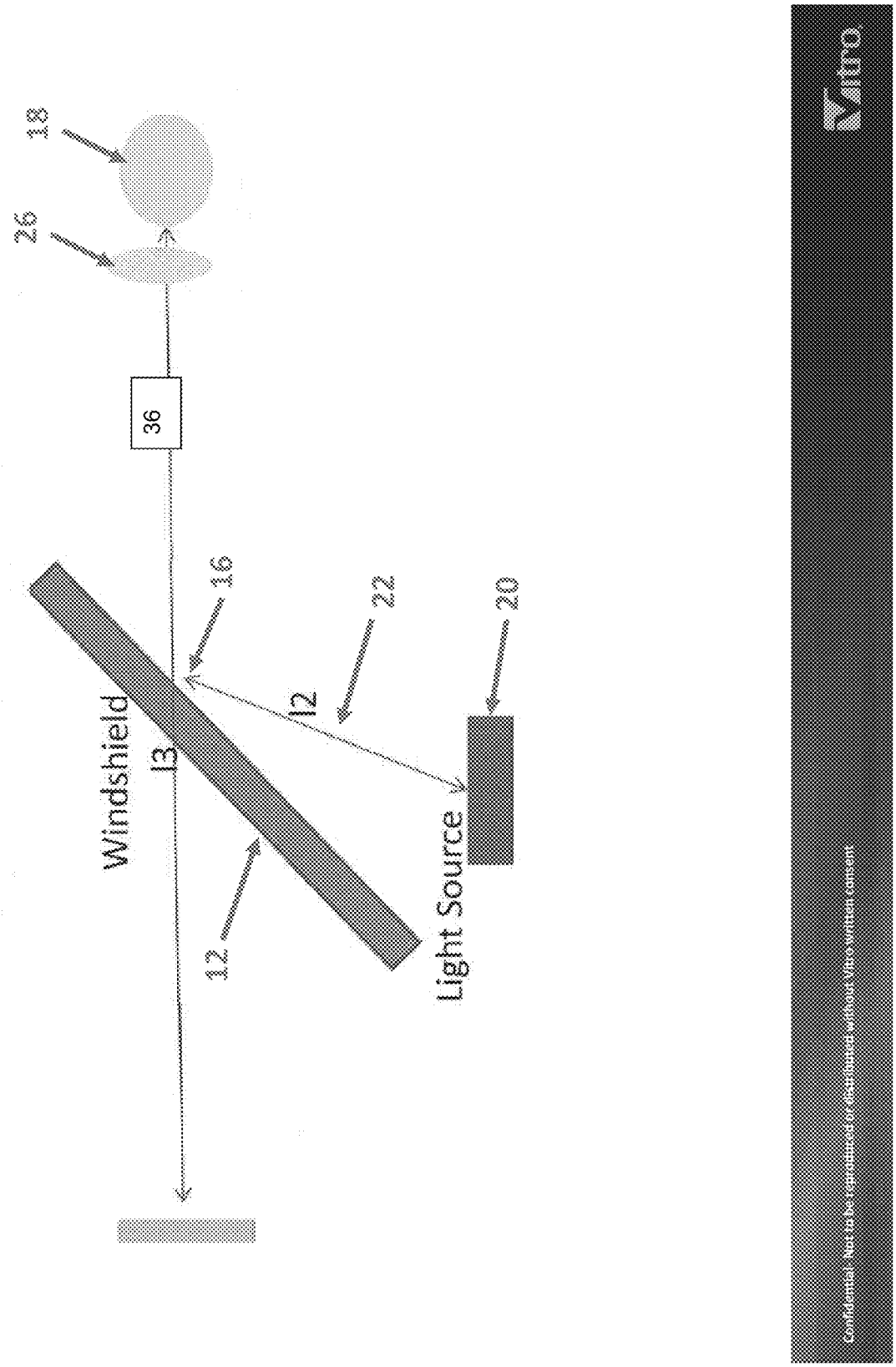
FIG. 6 is a diagram that illustrates an embodiment of the presently disclosed invention that includes an aspheric lens.

FIGS. 5 and 6 illustrate that test grid and light source 20 generate a light beam 22. Light beam 22 defines an image of test grid 20 such that, when light beam 22 illuminates heads-up display surface 16 of the transparent panel of windshield 12, at least a portion of light beam 22 is reflected from heads-up display surface 16 of the transparent panel that is illuminated by light beam 22.

Figure 2:
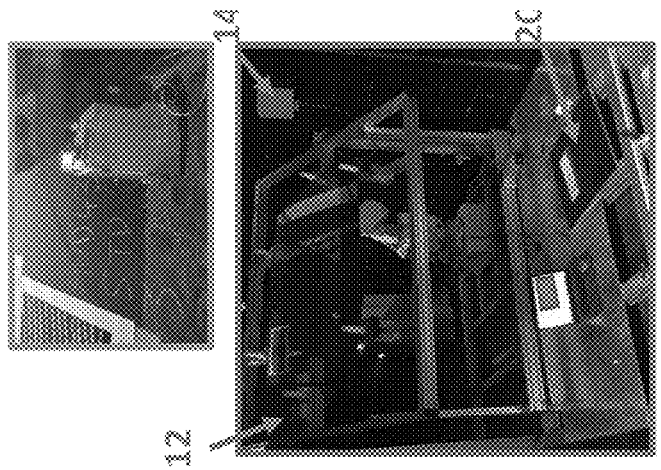
FIG. 2 shows examples of virtual images of test grids as imaged by a camera according to the presently disclosed invention.

As shown in FIG. 1, camera 18 is mounted on a robot 24 that can manipulate the position of camera 18. Alternatively, camera 18 can be mounted directly to frame 14. Camera 18 is located and oriented to receive and record images of test grid 20 that are reflected from heads-up display surface 16. Examples of images of test grid 20 that are recorded by camera 18 are shown in FIG. 2.

Figure 7:
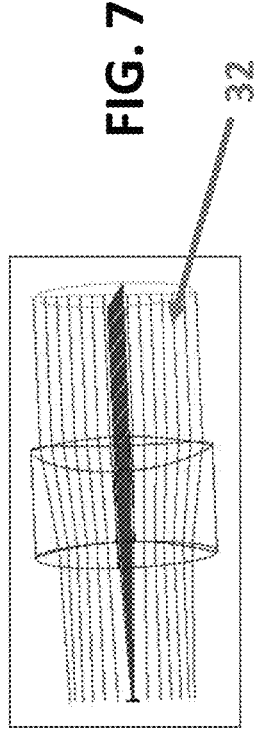
FIG. 7 is a diagram that illustrates a toroidal aspheric lens of a type that is suitable for use in the embodiment illustrated in FIG. 6.

As previously discussed herein, complex curvatures in the surface of windshield 14 and optical aberrations in heads-up display surface 16 may cause camera images to be unclear so that test fixture 10 has difficulty in reliably assessing the heads-up display performance of windshield 12. As illustrated in FIGS. 5, 6, and 7, test fixture 10 includes a device 26 that has an aspheric surface to attain an improved assessment of the heads-up display performance of windshield 12. Aspheric device 26 is in the path of light beam 22 that travels from light source 20 to heads-up display surface 16, and from heads-up display surface 16 to camera 18. When the aspheric surface device 26 is illuminated by light beam 22 from source 20, the aspheric surface modifies light beam 26 to compensate for the effects of differences in the windshield's curvature and for optical aberrations in heads-up display surface 16. Light beam 22 thus modified tends to produce camera images with higher resolution and, thus, enhances the accuracy and reliability of test fixture 10.

FIGS. 5 and 6 illustrate that test fixture 10 includes different types of aspheric devices. In the embodiment of FIG. 5, aspheric device 26 is an aspheric mirror 28 that is positioned in the pathway of light beam 22 between test grid 20 and heads-up display surface 16 such that said aspheric surface of aspheric mirror 28 is illuminated by beam 22 of light source 20 and reflects the image of test grid 20 in light beam 22.

Figure 8:
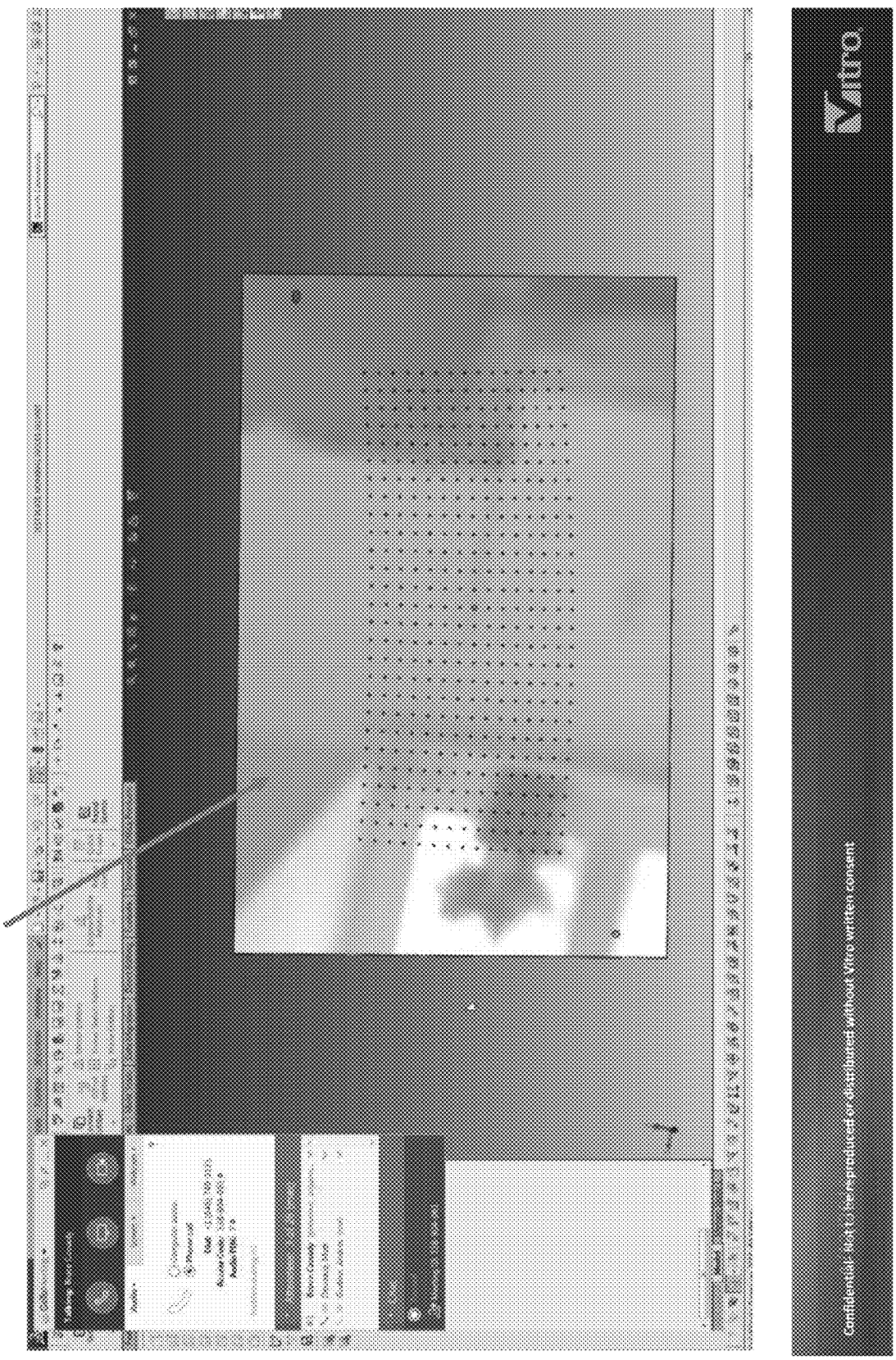
FIG. 8 shows an aspheric mirror of a type that is suitable for use in an embodiment such as illustrated in FIG. 5.

Aspheric mirror 28 compensates for curvatures in the windshield and aberrations in the heads-up surface so that the image of test grid 20 that is reflected from heads-up surface 16 can be more nearly focused by camera 18. In this way, aspheric device 26 modifies light beam 22 to increase the resolution of at least a portion of the image of test grid 20 that is transmitted from light source and test grid 20 and reflected from heads-up display surface 16 to camera 18. A specimen of aspheric mirror 28 is shown in FIG. 8.

In the embodiment of FIG. 6, aspheric device 26 is an aspheric lens 30 that may be a toroidal aspheric lens 32 such as illustrated in FIG. 7. Aspheric lens 30 defines an aspheric surface that is positioned in the pathway of light beam 22 between heads-up display surface 16 and camera 18. The aspheric surface of aspheric lens 30 refracts the image of test grid 20 that is reflected from heads-up display surface 16. Aspheric lens 30 is illuminated by the test grid image that is reflected from heads-up display surface 16 toward camera 18 and refracts the light to compensate for curvatures in the windshield and aberration in heads-up display surface 16 so that camera 18 can better focus the reflected image from heads-up display surface 16.

Test fixture 10 further includes a computer 34 that is configured to enable it to identify and measure elements of test grid 20 that appear in the virtual heads-up display. The image of test grid 20 as viewed by camera 18 then is compared with applicable performance specifications.

Figure 8A:
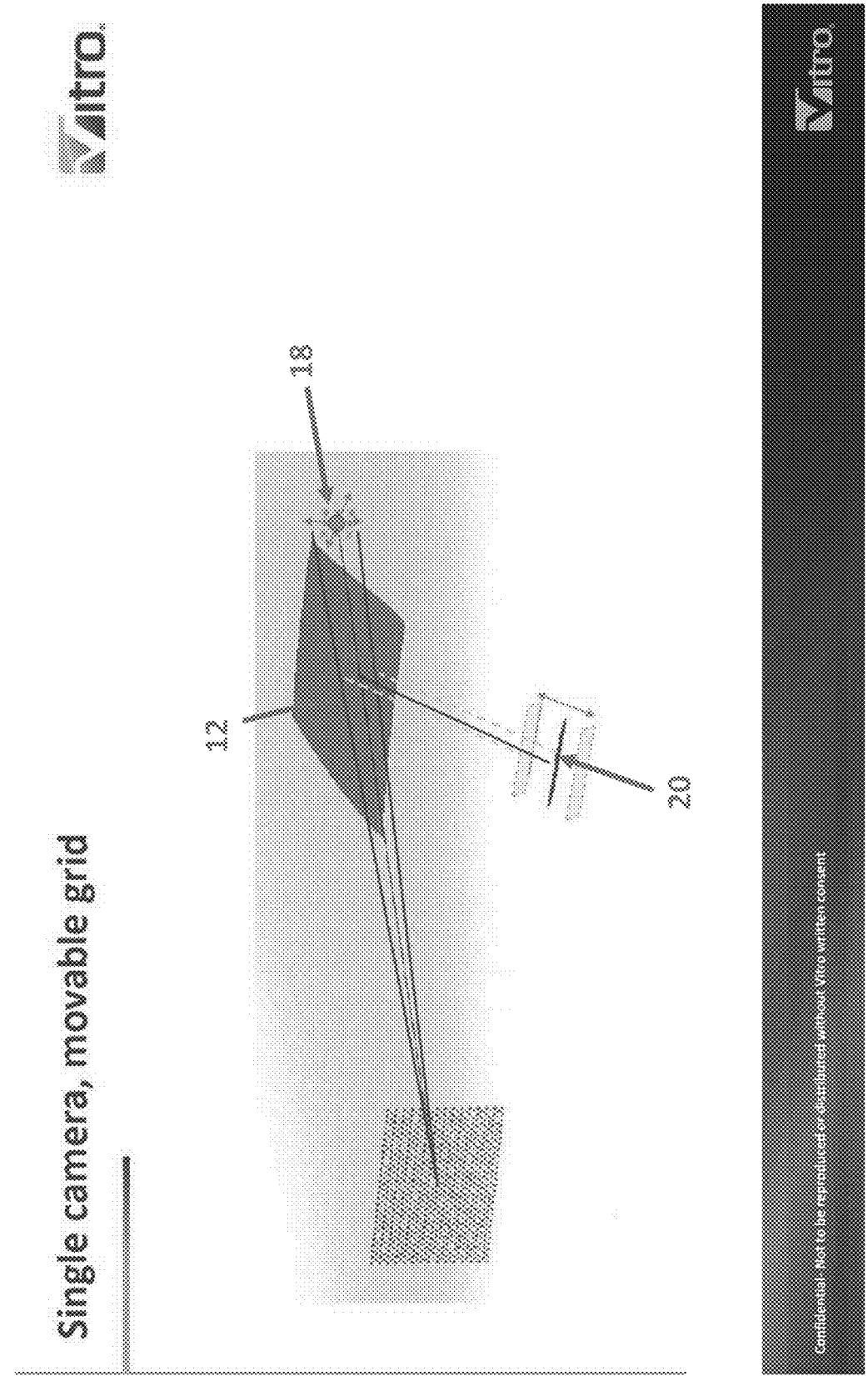
FIG. 8A illustrates the relationship between the preferred camera elevation and the moveable position of test grid 20.

FIG. 8A illustrates that test fixture 10 wherein test grid 20 is separated from heads-up display surface 16 by a space that is established according to the elevation the camera 18. In this embodiment, the position of test grid 20 can be moved away from heads-up display surface 16 and camera 18 can be moved to a lower elevation to better evaluate the heads-up capability of windshield 12. To better evaluate the heads-up capability of windshield 12 from a higher camera elevation, the position of test grid 20 can be moved toward heads-up surface 16 and camera 18 can be moved to a higher elevation.

Figure 3:
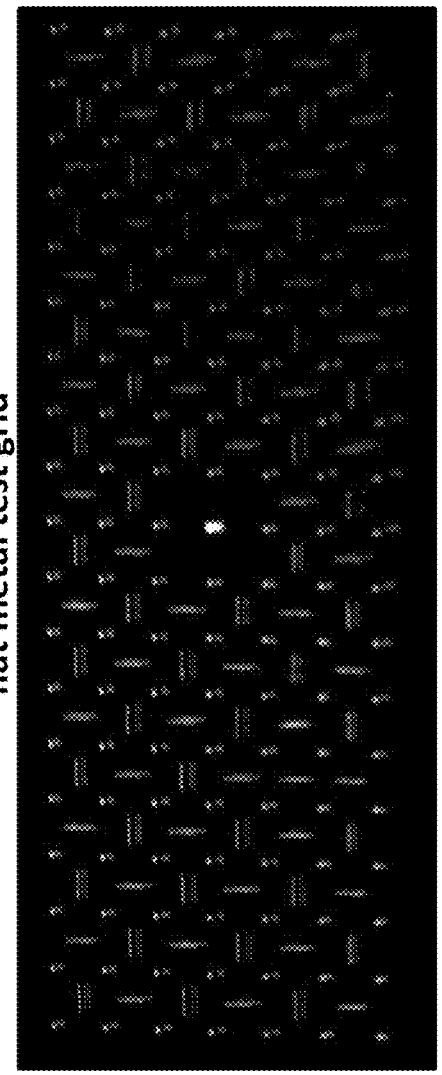
FIG. 3 shows a test fixture that is similar to the test fixture of FIG. 1 with the test grid in a tilted position.
Figure 4:
FIG. 4 shows the test grid that is similar to the test fixture that is shown in FIG. 3.

FIGS. 2, 3, and 4 show that the orientation of test grid 20 with respect to heads-up display surface 16 can be adjusted to control the angle of incidence between light beam 22 and heads-up display surface 16. In this way, the geometry of relating to the ghost image reflected from surface 1 can be changed such that the ghost image is superimposed on the reflection from the heads-up display surface to obscure the ghost image. For this purpose, test grid 20 can be mounted on frame 14 on a pivotal mounting that is aligned with a first axis and tilted on a first axis to adjust the angle of incidence. Similarly test grid 20 can be tilted on a second axis to further adjust the angle of incidence. Such pivotal mounting enables adjustment of the separation between test grid 20 and heads-up display surface 16 to increase the resolution of the image of test grid 20 in the virtual heads-up image.

To account for the different light intensity of different ghost reflections, test fixture controls the exposure time of the camera. Longer exposures equate to more intense reflections.

Figure 9:
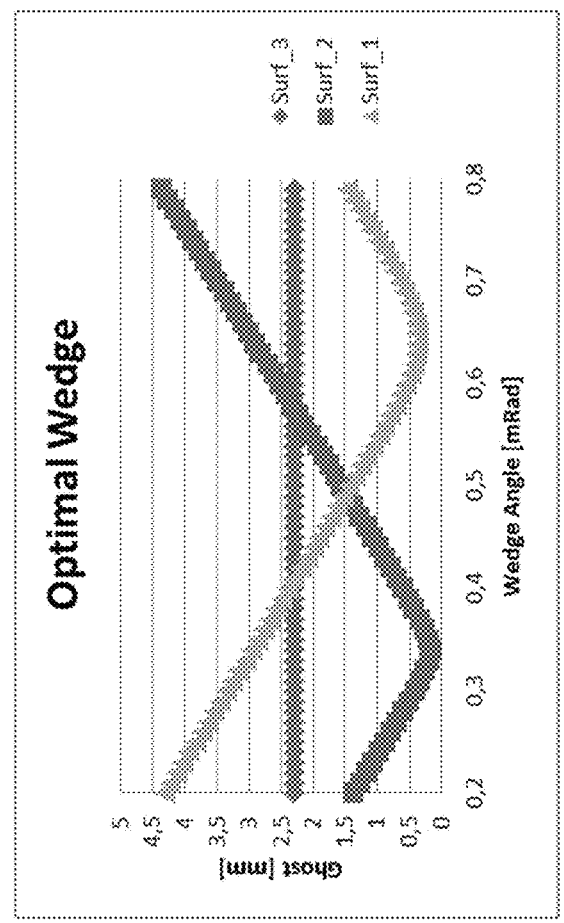
FIG. 9 illustrates a relationship between a primary virtual image and secondary ghost images as a function of the wedge angle.

The testing of windshield laminates that include IR coatings involves additional points for attention. FIG. 9 shows that the orientation of test grid 20 may be useful in obscuring a ghost image. Tilting the test grid may have the same effect as applying a wedge with an equivalent angular position. If the IR coating is located on the number 2 surface, tilting the test grid is similar to adding to the wedge angle by an equivalent angular amount. Thus, tilting the test grid or increasing the wedge can cause the secondary ghost to be obscured by the primary reflected image from surface 1.

Figure 10:
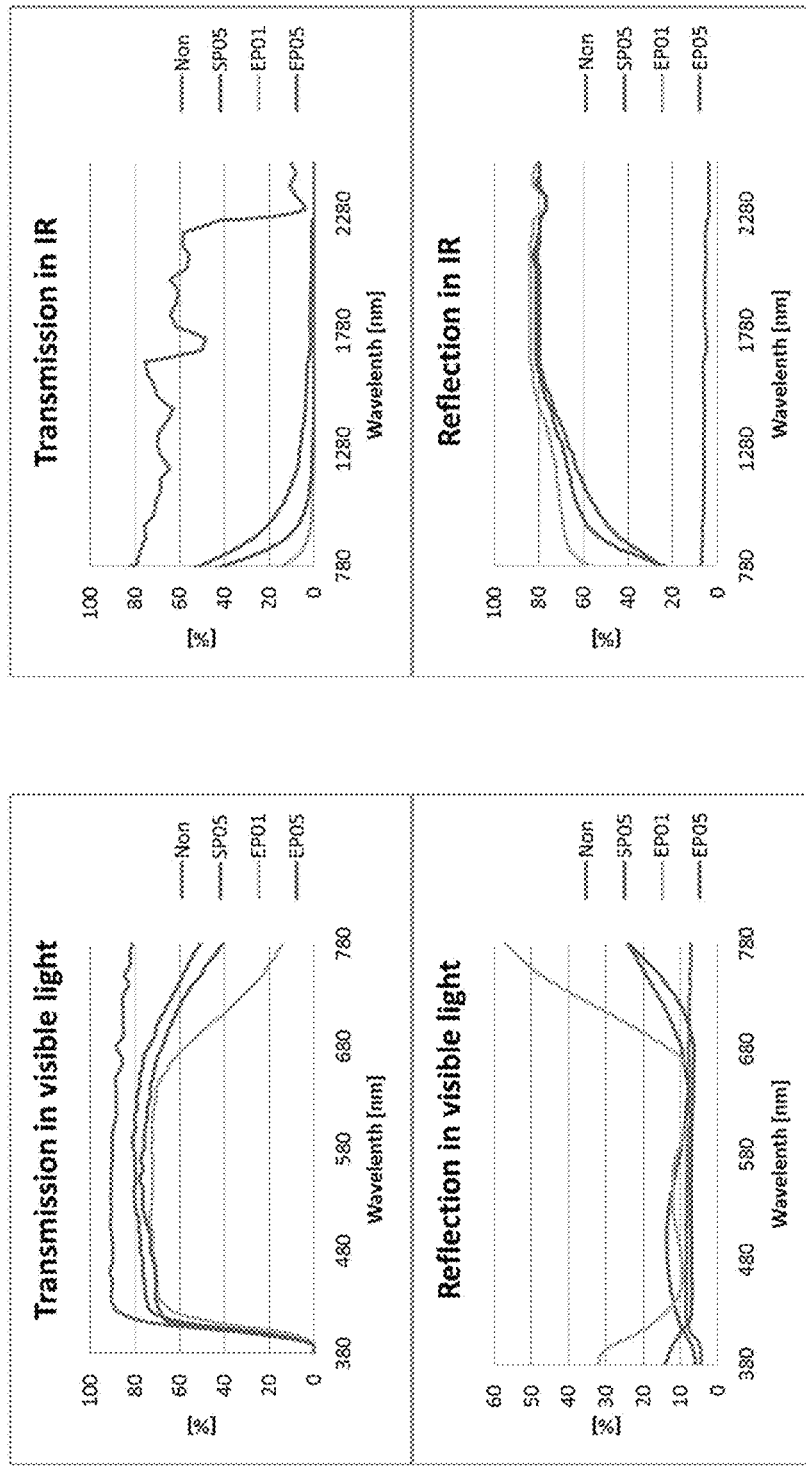
FIG. 10 shows a diagrams of light transmissivity and reflectivity of IR coated laminates over various wavelengths.

FIG. 10 shows that the reflection for various coatings is high in the IR range, but very low in the visible range between 460-680 nm. This means that the intensity of the secondary ghost from the IR coating is weak for visible light in the 460-680 nm range. FIG. 11 shows line graphs that are more precise as to the properties of secondary ghosts from IR coatings. The line graph for IR coatings and the accompanying table show that the reflecting property is weakest at 630 nm. This can be exploited to avoid the secondary ghosts from IR coatings while evaluating windshields with IR coatings.

Test fixture 10 further includes a light filter 36 that is located in the pathway of light reflected from heads-up display surface 16 to camera 18. Filter 36 transmits light within a predetermined bandwidth that is centered on a wavelength of 630 nm. The secondary ghost from the IR coating has low light intensity in this band and filter 36 rejects light outside of that bandwidth. Therefore, camera 18 can take a more distinct image of the virtual image.

The presently disclosed invention is not limited to the embodiments previously described herein and it will be apparent that other embodiments of the presently disclosed invention are included in the following claims.

We claim:

1. A fixture for testing the performance of the heads-up display feature of a windshield that is intended for use in a selected make and model of a vehicle, said fixture comprising:

a frame for maintaining a windshield that includes a transparent panel that defines a surface for heads-up displays, said heads-up display surface having one or more optical aberrations;

a test grid and light source, said test grid being mounted on said frame and configured in accordance with a selected test pattern corresponding to a selected make and model of vehicle, said test grid and light source being capable of generating a light beam that defines an image of said test grid such that, at times when said light beam illuminates the heads-up display surface of said transparent panel, at least a portion of said light beam is reflected from the heads-up display surface of said transparent panel that is illuminated by said light beam;

a camera that is mounted to said frame and that is located to receive and record images of said test grid that are reflected from said heads-up display surface; and a device that defines an aspheric surface that is illuminated by said light beam, said device modifying said light beam to increase the resolution of at least a portion of said image of said test grid that is transmitted from said light source and test grid and reflected from said heads-up display surface of said transparent panel to said camera; and a computer that is configured to enable it to identify and measure elements of said test grid appearing in the virtual heads-up display such that the image of a test grid as viewed by said camera can be compared with applicable performance specifications.

2. The test fixture of claim 1 wherein said device that defines an aspheric surface is an aspheric mirror that is positioned in the pathway of said light beam between said test grid and said heads-up display surface of said transparent panel such that said aspheric surface of said aspheric mirror reflects the image of said test grid in said light beam.

3. The test fixture of claim 1 wherein said device that defines an aspheric surface is a lens that is positioned in the pathway of said light beam between said heads-up display surface and said camera, said aspheric surface of said aspheric lens refracting the image of said test grid that is reflected from the heads-up display surface of said transparency panel.

4. The test fixture of claim 1 wherein said test grid is separated from said heads-up display surface of said transparent panel by a space that is established according to the elevation of the said camera.

5. The test fixture of claim 4 wherein the position of said test grid is adjustable with respect to the heads-up display surface of said transparent panel such that the separation between said test grid and said heads-up display surface can be adjusted to be made longer or shorter.

6. The test fixture of claim 5 wherein the separation between said test grid and said heads-up display surface can be shortened to accommodate an increase in the elevation of said camera with respect to said windshield.

7. The test fixture of claim 5 wherein the separation between said test grid and said heads-up display surface can be increased to accommodate a decrease in the elevation of said camera with respect to said windshield.

8. The test fixture of claim 1 wherein the orientation of said test grid with respect to the heads-up display surface of said transparent panel is adjustable to control the angle of incidence between the light beam and the heads-up display surface of said first transparent panel.

9. The test fixture of claim 8 wherein said test grid can be tilted on a first axis to adjust the angle of incidence.

10. The test fixture of claim 9 wherein said test grid can be tilted on a second axis to further adjust the angle of incidence.

11. The test fixture of claim 3 wherein said aspheric lens is an aspheric toroidal lens.

12. The test fixture of claim 2 wherein the aspheric surface of said aspheric mirror is contoured to compensate for said optical aberrations in the heads-up display surface of said first transparent panel.

13. The test fixture of claim 3 wherein the aspheric surface of said aspheric lens is contoured to compensate for said optical aberrations in the heads-up display surface of said first transparent panel.

14. The test fixture of claim 1 wherein said camera modulates the exposure time of images of said test grid to mimic the light intensity of said images of said test grid.

15. The test fixture of claim 1 for use with windshields that include a coating for blocking light in the infrared spectrum, said coating reflecting light from said illumination beam to form a secondary ghost in said heads-up display image, said test fixture further comprising a light filter that is located in the pathway of light reflected from said heads-up display surface to said camera, said filter transmitting light within a predetermined bandwidth wherein the said secondary ghost has low light intensity, said filter rejecting light outside of said predetermined bandwidth such that said camera can take a more distinct image of the virtual image.

16. The test fixture of claim 15 wherein said bandwidth of said filter is selected on the basis of the wavelength of the lowest reflection from the IR coating in the visible light spectrum.

17. The test fixture of claim 1 wherein the position of said test grid is manipulated by a mechanical robot.

18. The test fixture of claim 1 further including a robot that manipulates the position of said camera.

* * * * *